United States Patent
Diewald et al.

(10) Patent No.: US 8,782,293 B1
(45) Date of Patent: Jul. 15, 2014

(54) INTRA-PROCESSOR OPERATION CONTROL

(71) Applicant: Texas Intruments Deutschland GmbH, Freising (DE)

(72) Inventors: Horst Diewald, Freising (DE); Johann Zipperer, Unterschleissheim (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/917,798

(22) Filed: Jun. 14, 2013

(51) Int. Cl.
*G06F 3/06* (2006.01)
*G06F 13/12* (2006.01)

(52) U.S. Cl.
CPC ........................................ *G06F 3/06* (2013.01)
USPC ............. 710/5; 710/2; 710/8; 710/15; 710/32

(58) Field of Classification Search
None
See application file for complete search history.

(56) References Cited

U.S. PATENT DOCUMENTS

2008/0091867 A1* 4/2008 Plondke et al. ............... 710/261

* cited by examiner

*Primary Examiner* — Scott Sun
(74) *Attorney, Agent, or Firm* — John R. Pressetto; Frederick J. Telecky, Jr.

(57) ABSTRACT

A processor and execution units providing intra-processor operation control. In one embodiment, a processor includes a processor core and a peripheral device. The processor core includes a first execution unit and a second execution unit. The second execution unit is coupled to the first execution unit and the peripheral device. The second execution unit is configured to execute a complex instruction, and includes a status register and execution control logic. The status register includes an execution control information field configured to store execution control information. The execution control information specifies operational parameters of the peripheral device. The execution control logic is configured to apply the execution control information to generate execution control signals, and to control operation of the peripheral device via the execution control signals.

25 Claims, 6 Drawing Sheets

INTRA-PROCESSOR OPERATION CONTROL

BACKGROUND

Microprocessors (processors) are instruction execution devices that are applied, in various forms, to provide control, communication, data processing capabilities, etc. to an incorporating system. Processors include execution units to provide data manipulation functionality. Exemplary execution units may provide arithmetic operations, logical operations, floating point operations etc. Processors invoke the functionality of the execution units in accordance with the requirements of the instructions executed by the processor.

SUMMARY

A processor and execution units providing novel intra-processor operation control are disclosed herein. In one embodiment, a processor includes a processor core and a peripheral device. The processor core includes a first execution unit and a second execution unit. The second execution unit is coupled to the first execution unit and the peripheral device. The second execution unit is configured to execute a complex instruction, and includes a status register and execution control logic. The status register includes an execution control information field configured to store execution control information. The execution control information specifies operational parameters of the peripheral device. The execution control logic is configured to apply the execution control information to generate execution control signals, and to control operation of the peripheral device via the execution control signals. In some embodiments, the peripheral device may be exclusively owned by the second execution unit.

In another embodiment, a processor includes a processor core. The processor core includes a first execution unit and a second execution unit coupled to the first execution unit. The second execution unit is configured to execute a complex instruction, to provide a plurality of processing chains where each of the processing chains including execution of a complex instruction, to suspend execution of each of the processing chains while executing the complex instruction prior to completion of execution of the complex instruction, and to resume execution of each of the processing chains based on detection of a trigger event or a trigger signal that indicates execution of the processing chain is to continue.

In a further embodiment, a processor includes a processor core, an instruction buffer, and a peripheral device. The processor core includes a first execution unit and a second execution unit coupled to the first execution unit. The instruction buffer and the peripheral device are coupled to the second execution unit. The second execution unit is configured to provide a processing chain comprising execution of a complex instruction. The second execution unit includes a status register and execution control logic. The status register includes an execution control information field configured to store execution control information. The execution control information specifies execution unit activity state, execution unit inactivity state, condition to suspend execution, cause of suspension of execution, and power mode information. The power mode information controls the power mode of at least one of the first execution unit, the second execution unit, and the peripheral device. The execution control information field also includes execution control flags that are manipulatable to control starting of execution, suspension of execution, resumption of execution, and ending of execution for the processing chain. The execution control logic is configured to apply the execution control information and the execution control flags to generate execution control signals, and to control operation of the peripheral and execution of the signal processing chain via the execution control signals.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
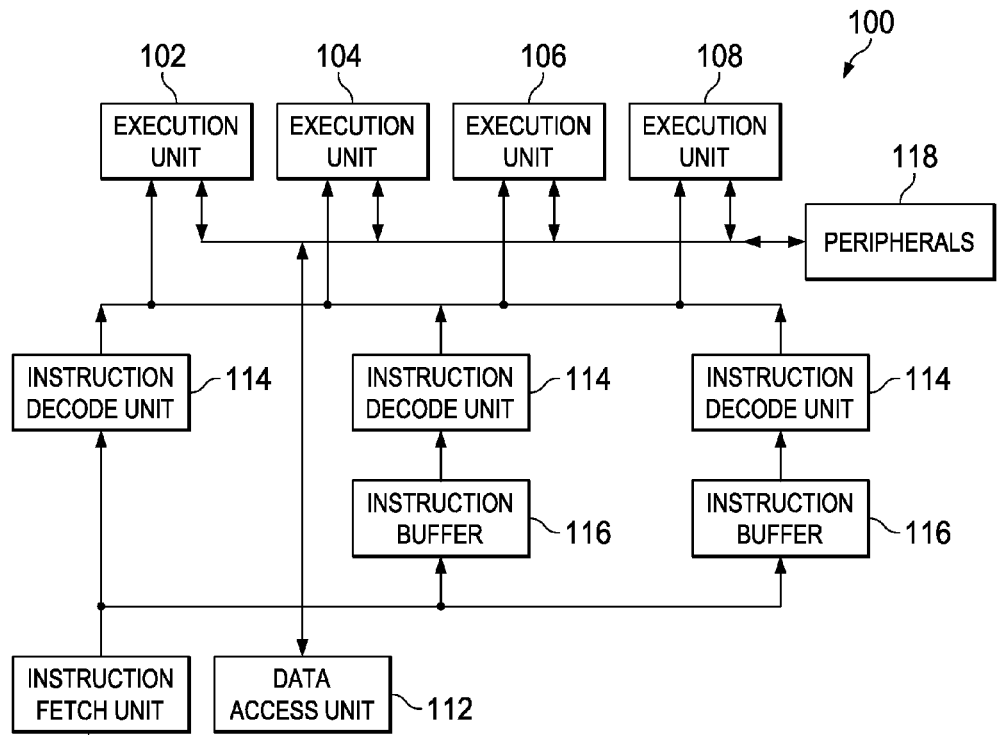
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

Further, the term "processing chain" refers to a data or signal processing sequence implemented in an execution unit. A processing chain may apply a sequence of one or more complex instructions, and/or a mix of complex and non-complex instructions. Operation of a processing chain may also set, control, and/or modify the hardware used to implement the processing chain.

Further, the term "software" includes any executable code capable of running on a processor, regardless of the media used to store the software. Thus, code stored in memory (e.g., non-volatile memory), and sometimes referred to as "embedded firmware," is included within the definition of software.

The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In conventional processor architectures, desired functionality is provided by execution of instructions arranged in accordance with that functionality. For example, to control a peripheral device as part of a processing sequence, a conventional processor may execute a series of instructions that move values to and/or from the peripheral, assert control signals to the peripheral, etc. While effectively providing needed functionality, execution of instructions to implement control functionality consumes power and/or storage resources that may be limited in some processor applications (e.g., embedded microcontroller applications).

Embodiments of the processors disclosed herein include execution units that are capable of providing control to peripherals, other execution units, and various devices in the processor based on execution control information stored in the execution unit rather by execution of instructions directed to providing the control functionality. Circuitry in the execution units and/or external to the execution units may generate control signals based on the execution control information that directs the operation of intra-processor devices in conjunction with instruction execution. For example, in embodiments of the processors disclosed herein, an execution unit may execute a complex instruction that processes data over many cycles. A complex instruction applicable to the processors disclosed herein may provide mathematical functionality (such as evaluation of trigonometric functions, root functions, etc.), signal processing functions, statistical functions, logical functions, financial computations, encryption/decryption, etc.

The data processed by a complex instruction may be provided by a peripheral that requires control from the execution unit. The execution unit may provide the needed control during execution of the complex instruction based on control information stored in the execution unit. By providing intra-processor control via such execution control information embodiments reduce the number of instructions executed to support control operations, and thereby reduce processor power consumption and/or instruction storage requirements.

FIG. 1 shows a block diagram of a processor 100 in accordance with various embodiments. The processor 100 includes a plurality of execution units 102, 104, 106, 108. Other embodiments may include one or more execution units. The processor 100 also includes an instruction fetch unit 110, a data access unit 112, and one or more instruction decode units 114. Some embodiments further include one or more instruction buffers 116. In some embodiments of the processor 100, two or more of the execution units 102-108 may be components of a single processor core. Some embodiments of the processor 100 also include peripherals 118. The peripherals 118 may include components that operate in conjunction with the execution units to perform a processing operation. For example, the peripherals 118 may include data storage resources, such as random access memory, communication components, timers, analog-to-digital converters, clock generators, debug logic, voltage references, resource management, input/output ports, etc.

One or more of the execution units 102-108 can execute a complex instruction. For example, an execution unit 102-108 may be configured to execute a fast Fourier transform (FFT), execute a finite impulse response (FIR) filter, solve a trigonometric function, evaluate a polynomial, etc. The execution units 102-108 allow complex instructions to be interrupted prior to completion of the instruction's execution. While an execution unit (e.g., EU 108) is servicing an interrupt, other execution units (EU 102-106) continue to execute other instructions. The execution units 102-108 may synchronize operation based on a requirement for a result and/or status generated by a different execution unit. For example, an execution unit 102 that requires a result value from execution unit 104 may be stalled until the execution unit 104 has produced the required result. One execution unit, e.g., a primary execution unit, may provide instructions to, or otherwise control the instruction execution sequence of, other execution units.

The instruction fetch unit 110 retrieves instructions from storage (not shown) for execution by the processor 100. The instruction fetch unit 110 may provide the retrieved instructions to a decode unit 114. The decode unit 114 examines instructions, locates the various control sub-fields of the instructions, and generates decoded instructions for execution by the execution units 102-108. As shown in FIG. 1, multiple execution units may receive decoded instructions from an instruction decoder 114. In some embodiments, an instruction decoder 114 may be dedicated to one or more execution units. Thus, each execution unit 102-108 may receive decoded instructions from an instruction decoder 114 coupled to only that execution unit, and/or from an instruction decoder 114 coupled to a plurality of execution units 102-108. Some embodiments of the processor 100 may also include more than one fetch unit 110, where a fetch unit 110 may provide instructions to one or more instruction decoder 114.

Embodiments of the processor 100 may also include one or more instruction buffers 116. The instruction buffers 116 store instructions for execution by the execution units 102-108. An instruction buffer 116 may be coupled to one or more execution units 102-108. An execution unit may execute instructions stored in an instruction buffer 116, thereby allowing other portions of the processor 100, for example other instruction buffers 116, the instruction fetch unit 110, and instruction storage (not shown), etc., to be maintained in a low-power or inoperative state. An execution unit may lock or freeze a portion of an instruction buffer 116, thereby preventing the instructions stored in the locked portion of the instruction buffer 116 from being overwritten. Execution of instructions and/or instruction sequences stored in an instruction buffer 116 (e.g., a locked portion of an instruction buffer 116) may save power as no reloading of the instructions from external memory is necessary, and may speed up execution when the execution unit executing the instructions stored in the instruction buffer 116 is exiting a low-power state. An execution unit may call instructions stored in a locked portion of an instruction buffer 116 and return to any available power mode and/or any state or instruction location. The execution units 102-108 may also bypass an instruction buffer 116 to execute instructions not stored in the instruction buffer 116. For example, the execution unit 104 may execute instructions provided from the instruction buffer 116, instructions provided by the instruction fetch unit 110 that bypass the instruction buffer 116, and/or instructions provided by an execution unit 102, 106-108.

The instruction buffers 116 may also store, in conjunction with an instruction, control or other data that facilitate instruction execution. For example, information specifying a source of an instruction execution trigger, trigger conditions and/or trigger wait conditions, instruction sequencing information, information specifying whether a different execution unit or other processor hardware is to assist in instruction execution, etc. may be stored in an instruction buffer 116 in conjunction with an instruction.

The data access unit 112 retrieves data values from storage (not shown) and provides the retrieved data values to the execution units 102-108 for processing. Similarly, the data access unit 112 stores data values generated by the execution units 102-108 in a storage device (e.g., random access memory external to the processor 100). Some embodiments of the processor 100 may include more than one data access unit 112, where each data access unit 112 may be coupled to one or more of the execution units 102-108.

The execution units 102-108 may be configured to execute the same instructions, or different instructions. For example, given an instruction set that includes all of the instructions executable by the execution units 102-108, in some embodiments of the processor 100, all of the execution units 102-108 may be configured to execute all of the instructions of the instruction set. Alternatively, some execution units 102-108 may execute only a sub-set of the instructions of the instruction set. At least one of the execution units 102-108 is configured to execute a complex instruction that requires a plurality of instruction cycles to execute.

Each execution unit 102-108 is configured to control access to the resources of the processor 100 needed by the execution unit to execute an instruction. For example, each execution unit 102-108 can enable power to an instruction buffer 116 if the execution unit is to execute an instruction stored in the instruction buffer 116 while other instruction buffers, and other portions of the processor 100, remain in a low power state. Thus, each execution unit 102-108 is able to independently control access to resources of the processor 100 (power, clock frequency, etc.) external to the execution unit needed to execute instructions, and to operate independently from other components of the processor 100.

To improve processing efficiency, the execution units 102-108 and/or other devices in the processor 100 store and apply execution control information to control features and/or devices of the processor 100. Various forms of execution control information may be applied to control the operation of peripherals 118 as needed to facilitate functionality, to control power modes of execution units 102-108 or other intra-processor devices, to control instruction buffer 114 operation, to control interaction of execution units 102-108, etc. By implementing control via execution control information, embodiments can provide autonomous processing chains using a single instruction (or a small number of instructions) to implement complex functionality. Accordingly, the number of instructions stored, and the power consumed in instruction movement and execution may be reduced in various embodiments of the processor 100.

Figure 2:
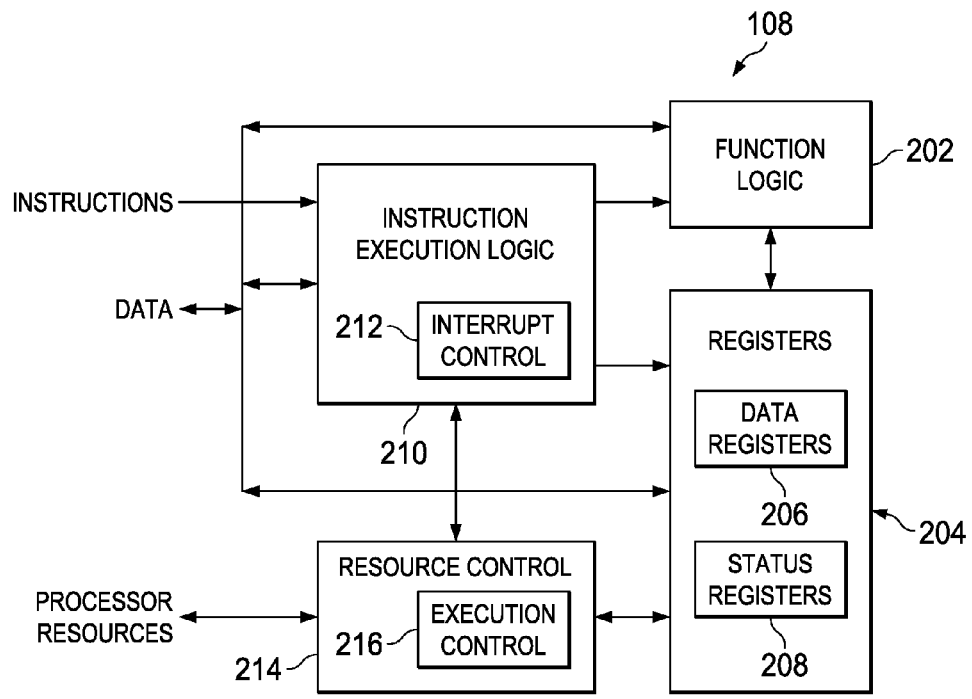
FIG. 2 shows a block diagram of an execution unit in accordance with various embodiments.

FIG. 2 shows a block diagram for an execution unit 108 in accordance with various embodiments. The block diagram and explanation thereof may also be applicable to embodiments of the execution units 102-106. The execution unit 108 includes function logic 202, registers 204, and instruction execution logic 210. The function logic 202 includes the arithmetic, logical, and other data manipulation resources for executing the instructions relevant to the execution unit 108. For example, the function logic may include adders, multipliers, shifters, logical functions, etc. for integer, fixed point, and/or floating point operations in accordance with the instructions to be executed by the execution unit 108.

The registers 204 include data registers 206 and status registers 208. The data registers 206 store operands to be processed by, and results produced by, the function logic 202. The number and/or size of registers included in the data registers 206 may vary across embodiments. For example, one embodiment may include 16 16-bit data registers, and another embodiment may include a different number and/or width of registers. The status registers 208 include one or more registers that store state/status information produced by operations performed by the execution unit 108, such as function logic 202, and/or store instruction execution and/or execution unit state information. State information stored in a status register 208 may include a zero result indicator, a carry indicator, result sign indicator, overflow indicator, interrupt enable indicator, instruction execution state, etc. Instruction execution state reflects the current state or progress of execution of an instruction. Instruction execution state may be saved as part of interrupt service initiation and restored as part of interrupt service termination. During instruction execution, the progress and correct execution of an instruction can be verified by inspection of the instruction execution state via a supervising hardware or software process or debug environment.

More specifically, a status register 208 may store execution control information. The execution control information may be applied by the execution unit 108 to control various processor resources, such as peripherals 118, instruction buffers 116, interaction between execution units, etc. The execution control information may be provided to the execution unit 108 via a field of an instruction currently being executed by the execution or a field of an instruction previously executed by the execution unit 108. The execution control information may be provided to the execution unit 108 at manufacture for use with a given instruction, provided by another execution unit at run-time, etc. Because the status registers 208 are preserved (e.g., by movement to memory or other registers) during service of an interrupt, the execution control information stored in or accessed via the status registers 208 may be saved with the status register 208 at interrupt service initiation and restored at interrupt service completion thereby preserving the execution control information across interrupts. The execution control information stored in a status register 208 may specify resource selection, resource operational parameters, and/or resource timing, where a resource may be a peripheral 118 or other device of the processor 100 applied by the execution unit 108. The execution control information stored in a status register 208 may also specify resource power modes, inter-execution unit operations, execution unit/peripheral interaction, execution unit/instruction buffer interaction, etc. In some embodiments, execution control information may be indirectly referenced via a status register 208. For example, a pointer or index value stored in a status register 208 may indicate the location of execution control information to be applied by the execution unit 108.

The instruction execution logic 210 controls the sequencing of instruction execution in the execution unit 108. The instruction execution logic 210 may include one or more state machines that control the operations performed by the function logic 202 and transfer of data between the registers 204, the function logic 202, other execution units 102-106, the data access unit 112, and/or other components of the processor 100 in accordance with an instruction being executed. For example, the instruction execution logic 210 may include a state machine or other control device that sequences the multiple successive operations of a complex instruction being executed by the execution unit 108.

The instruction execution logic 210 includes interrupt control logic 212 that allows complex instructions executing in the execution unit 108 to be interrupted. The interrupt control logic 212 detects conditions, such as an interrupt event or reception of an instruction to be executed, that dictate interruption of a currently executing complex instruction. Responsive to detection of such a condition, the interrupt control logic 212 may cause the instruction execution logic 210 to suspend execution of the complex instruction and store in the registers 204, or other storage resource (e.g., a memory), information indicative of the state of the execution unit 108 at the point of suspension of execution (e.g., status register values, relevant data values, instruction execution sequence information, etc.). When the complex instruction execution state information has been saved, the instruction execution logic 210 sequences the execution unit 108 through the operations of a first interrupt service instruction, and any subsequent interrupt service instructions. On completion of the interrupt service, the instruction execution logic 210 restores the saved complex instruction execution state information to the registers 204 and the instruction execution logic 210, and resumes execution of the interrupted complex instruction.

In some embodiments of the execution unit 108, the interrupt control logic 212 may cause the execution unit 108 to return from an interrupt service to an execution state other than the next sequential execution state at the time the interruption was received. For example, the instruction execution logic 210 may recognize that processing conditions arising during the service of the interrupt may result in erroneous operation if the next sequential instruction/instruction state is executed. In such a situation, the interrupt control logic 212 may cause the instruction execution logic 210 to initiate post-interrupt processing at a predetermined reset instruction/instruction state or to enter a default state. A reset instruction state may be a state earlier than the next sequential state or may be another instruction state from which post-interrupt operation may be resumed without error. Resuming execution from a reset state may roll-back process execution to a state allowing the process to continue properly. Reset states may be predetermined or selected at run-time based on current operational conditions. The interrupt control logic 212 may also delay transition to an interrupt service until a state of execution is reached that allows post-interrupt resumption of execution at a next sequential execution state without error.

When processing of a set of instructions (e.g., a processing chain) is complete, the execution unit 108 may initiate execution of a different set of instructions and/or signal a different execution (e.g. by issuing an interrupt) regarding the completion. The signal may cause the different execution unit to further process a result of the set of instructions or perform other operations.

The execution unit 108 also includes resource control logic 214. The resource control logic 214 requests/controls access to the various resources (e.g., storage, power, clock frequency, etc.) of the processor 100 that the execution unit 108 uses to execute an instruction. By requesting processor resources independently for each execution unit 102-108, the power consumed by the processor 100 may be reduced by placing only components of the processor 100 required for instruction execution by an active execution unit 102-108 in an active power state. Furthermore, execution units 102-108 not executing instructions may be placed in a low-power state to reduce the power consumption of the processor 100.

The resource control logic 214 includes execution control logic 216. The execution control logic 216 accesses execution control information provided via the status registers 208 to provide control of peripherals 118 or other portions of the processor 100. For example, the execution control logic 216 may apply the execution control information in conjunction with other status/data values from registers 204 and instruction state information provided by the instruction execution logic 210 to assert control to peripherals 118, other execution units, etc. based on instruction execution state timing. In some embodiments, the execution control logic 216 may include state machines or other control structures to sequence control signaling based on the execution control information.

The execution control logic 216 may also control the transitioning of the execution unit 108 into a no-operation state (in which instruction execution is suspended), and provide control of processor resources by allowing the execution unit 108 to request a no-operation state in the processor resources (e.g., peripherals 118, other execution units, etc.) The execution control logic 216 can request a no-operation state in the execution unit 108 based on signals provided from outside the execution unit, such as a no-operation request asserted by a peripheral, notification of energy depletion, unavailability of clock signals, poor quality of samples to be processed, etc. The execution control logic 216 may request a no-operation state in a resource when the execution unit is unable to accept data provided by the resource. Thus, the execution unit 108 may employ no-operation requests to synchronize execution unit and peripheral device operation.

The execution logic 216 may provide a handshake signal or other feedback to a source of a no-operation request. The handshake signal may acknowledge the request, indicate whether and/or when the execution unit 108 will enter the no-operation state, define conditions that must be satisfied for the execution unit to enter the no-operation state, etc. Such conditions may include a time delay, initiation of another process, detection of a specified state or status of execution in the execution unit, reception or transmission of a specified signal, etc.

Execution control information stored in a status register 208 may specify sources of no-operation requests to which the execution unit 108 will respond, resources to which the execution unit 108 may assert a no-operation request, conditions of request acceptance, and how the execution unit 108 responds to a no-operation request. The execution control information may specify some execution state as being atomic (not interruptible), and therefore not susceptible to suspension due to receipt of a no-operation request or other interruption in execution.

Figure 3:
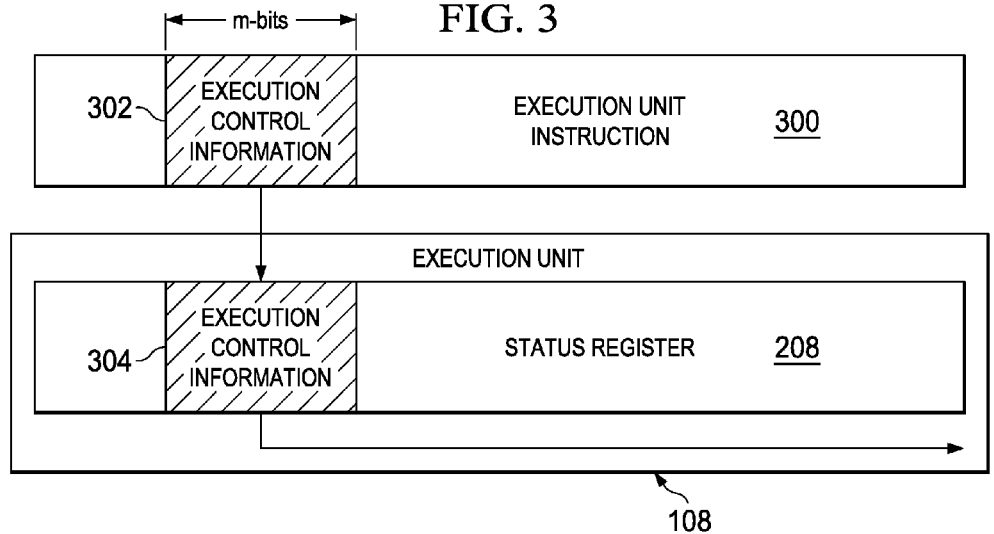
FIG. 3 shows an instruction that includes a field specifying execution control information in accordance with various embodiments.

FIG. 3 shows an instruction 300 executable by at least one of the execution units of the processor 100. The instruction 300 includes a field 302 specifying execution control information in accordance with various embodiments. Information provided in the ECI field 302 may directly or indirectly (e.g., via pointer) specify execution control information. Some embodiments of the instruction 300 may include more than one ECI field 302 where each ECI field 302 may be directed to control of a resource of the processor 100. The execution control information contained in the ECI field 302 is transferred to the ECI field 304 of a status register 208 in the execution unit that executes the instruction 300. The instruction 300 may perform a function other than transfer of execution control information. For example, the instruction 300 may be a FIR instruction that includes execution control information applied to control a peripheral during execution of the FIR instruction.

Figure 4:
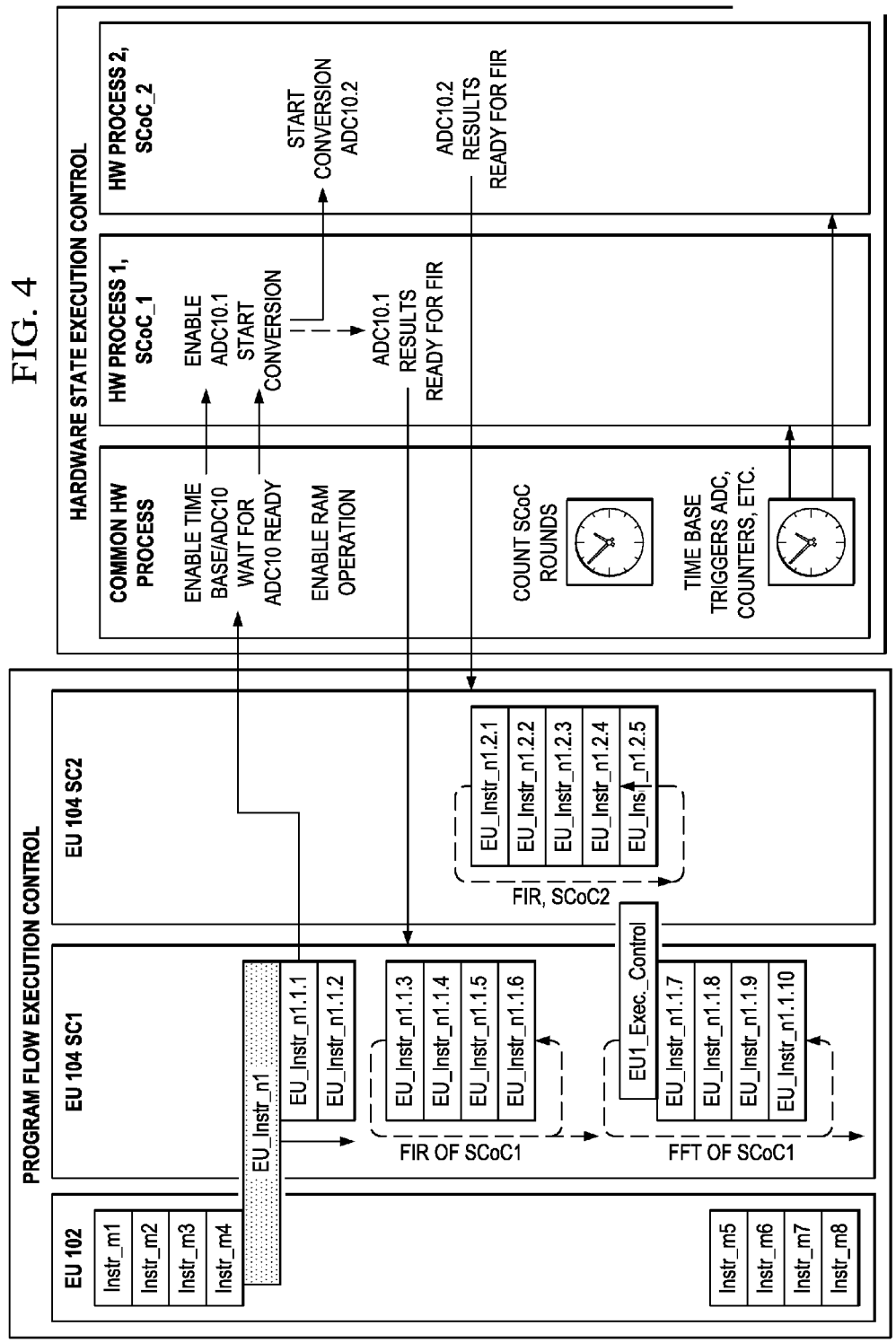
FIG. 4 shows an example of application of execution control information in an execution unit providing a plurality of signal processing chains in accordance with various embodiments.

FIG. 4 shows an example of application of execution control information in an execution unit providing a plurality of processing chains in accordance with various embodiments. In the execution units disclosed herein, execution of a processing chain or other process can be implemented at the hardware and/or software level. For example, all or a portion of processing chain processing can be implemented in either hardware or software. FIG. 4 shows execution of two signals chains initiated via instruction execution.

In FIG. 4, instructions Instr_m1 to Instr_m4 are fetched and executed by execution unit (EU) 102, which may be the CPU of the processor 100. Instruction EU_Instr_n1 is fetched next and directed to EU 104 for execution. EU_Instr_n1 is a complex instruction that provides FIR and FFT functionality when executed. Instruction EU_Instr_n1 may include an ECI field 302 that directly or indirectly provides execution control information. Alternatively, execution control information for use with instruction EU_Instr_n1 may have been previously provided to EU 104. The execution control information may specify parameters of ND conversion, data collection, filter operation, operations to perform on results, etc. The execution control information or a reference thereto may be stored in a status register 208 as described herein.

In execution state EU_Instr_n1.1.1, the execution control logic 216 applies the execution control information to configure and enable an ND converter, timers, DMA, etc. as needed to provide ND conversion of selected analog signals, and collection of samples for processing. ND conversion is initiated, and in execution state EU_Instr_n1.1.2, EU 104 suspends execution of processing chain SC1 while samples to be processed by instruction EU_Instr_n1 are generated and collected. When a predetermined number of samples have been generated and collected, EU 104 is triggered (e.g., by a signal from a timer, a DMA channel, etc. configured in execution state EU_Instr_n1.1.1) and execution of EU_Instr_n1 resumes with processing chain 1 FIR processing in instruction states EU_Instr_n1.1.3 through EU_Instr_n1.1.6. The execution control information may specify when EU 104 suspends and/or resumes execution based on, for example, elapsed time, a trigger signal, etc.

While executing the processing chain SC1, EU 104 is triggered to service a second processing chain SC2. In response, EU 104 suspends execution of processing chain SC1, and samples from a different ND channel are provided to EU 104 for FIR processing in execution states EU_Instr_n1.2.1 through EU_Instr_n1.2.5. In conjunction with the transition from SC1 to SC2, execution control information applicable to SC2 may be applied in place of execution control information applicable SC1. For example, filter parameters, sample location, number of samples, etc. for use with SC2 may differ from those applied in SC1. The two processing chains, SC1 and SC2, may be interleaved such that one processing chain executes filter processing while the other processing chain waits for the next ND conversion result to start the next filter processing.

With completion of instruction state EU_Instr_n1.2.5, execution of SC2 is suspended and execution of SC1 is resumed. In conjunction with the resumption of SC1, execution control information applicable to SC1 may be applied in place of execution control information applicable SC2. SC1 continues with FFT processing in instruction execution states EU_Instr_n1.1.7 through EU_Instr_n1.1.10.

In FIG. 4, execution of instructions by EU 102 is suspended while EU 104 executes instruction EU_Instr_n1, and resumed when execution of instruction EU_Instr_n1 is complete. In some embodiments, EU 102 may execution instructions concurrent with execution of EU_Instr_n1 by EU 104. EU 104 may generate a trigger signal (e.g., an interrupt) that causes EU 102 to resume execution. The various interactions between EU 104, the peripherals (ND, timer, DMA, etc.), and EU 102 are controlled by the execution control logic 216 of the execution unit 104, and based on execution control information stored in the status registers 208 of the execution unit 104. Thus, the processor 100 provides control over peripherals and inter-execution unit interaction without requiring execution of instructions expressly for the purpose of providing such control.

Figure 5:
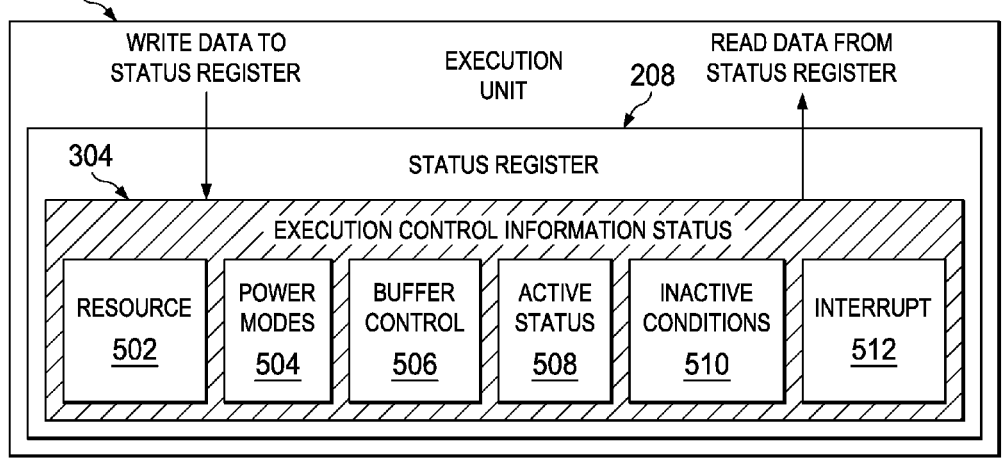
FIG. 5 shows various execution control information fields of a status register in accordance with various embodiments.

FIG. 5 shows various execution control information fields of a status register 208 in accordance with various embodiments. As described herein the execution control information fields 304 of, or referred to, by the status register 208 can include various types of execution control information. The execution control logic 216 may generate control signals, based on the execution control information 304, to control the execution unit, the peripherals 118, or other devices within the processor 100. Additional, an execution unit may monitor the execution control information of a different execution unit to control execution based on results or interim results of the execution process of the different execution unit. For example, execution unit 102 may monitor the execution control information of execution unit 108 to determine the state of execution unit 108 and whether the operation of execution unit 108 or any other execution unit should be changed.

In FIG. 5, the execution control information field 304 includes a resource field 502, a power modes field 504, a buffer control field 506, an active status field 508, an inactive conditions field 510, and an interrupt level field 512. Other embodiments of the ECI field 304 may include a different number and/or type of execution control information fields. The resource field 502 may include information applied to select and/or control one or more resources (e.g., peripherals) applied in conjunction with instruction execution. For example, the resource field 502 may specify use of a particular ND converter channel at a specified sampling interval.

The buffer control field 506 may include information for specifying locations of instructions in an instruction buffer 116 applicable to a processing chain. For example, the buffer control field 506 may specify a location in an instruction buffer 116 for a starting instruction of a processing chain, an ending instruction of a processing chain, an instruction at which processing chain execution was suspended, and instruction at which processing chain execution is to be resumed, etc. In some embodiments, flags of the buffer control field may be set and/or reset to control execution. Start, resume, suspend, and end execution control flags may be manipulated by software or execution unit hardware to manage instruction execution. The buffer control field 506 may further specify control information that the execution unit applies to control the operation of the instruction buffer. For example, the buffer control field 506 may specify a fullness level, or maximum number of instructions to be stored in the instruction buffer 116. If the instruction buffer 116 meets or exceeds the specified fullness level or maximum number of stored instructions, the execution unit 108 may generate control signals that cause the instruction buffer 116 to discontinue fetching of instructions from external memory. In some embodiments, execution of instructions from the instruction buffer 116 may be delayed until the instruction buffer 116 contains at least a predetermined number of instructions needed for an execution unit to execute a process in a suitable fashion (e.g., without delays caused by depletion of instructions from the instruction buffer 116).

In accordance with information provided from the buffer control field 506, an execution unit may execute an instruction or an instruction sequence stored in an instruction buffer a predetermined number of times, where the number of times may be fixed or variable. Alternatively, the buffer control field 506 may specify execution for a specified time, a specified number of cycles, until a specified event or condition occurs, etc. One such run-time defining condition may be an 'end' signal e.g. from an EU operational result, a signal or event, etc. Execution of an "end" instruction provides another method to terminate execution of an instruction sequence.

An instruction sequence can start with the execution of fetched instructions, but may also wait for the assertion of start conditions specified by the execution control information. There may be, for example, a software start with a dedicated instruction, addressing a buffer address, a start bit (start-of-execution bit), a start command, etc.

The active status and inactive status conditions fields 508, 510 may contain information specifying the current operational state and status of the execution unit 108. Such information may specify whether the execution unit is active or inactive, state and/or status of active/inactive condition, whether an instruction or instruction sequence has been completed, whether the execution unit is waiting to conditionally or unconditionally resume execution, etc. The active status and inactive conditions fields 508, 510 may also specify whether the execution unit has been halted unconditionally or conditionally halted by a request, whether the request is due to an internal condition of the execution unit or an external request. An external request may be, for example, an interrupt request or assertion of a not ready signal.

The interrupt field 512 may contain information specifying the state of the execution unit with regard to interrupts. For example, the interrupt field 512 may specify the current interrupt mode of the execution unit, current interrupt nesting level of the execution unit, conditions under which the execution unit should generate an interrupt, priority or privilege levels of interrupts/interrupt sources to be serviced, sources from which interrupts will be accepted, etc. In some embodiments, the information in the interrupt field may cause the execution unit 108 to interrupt the execution unit 102 when execution of an instruction by the execution unit 108 is suspended.

Figure 6:
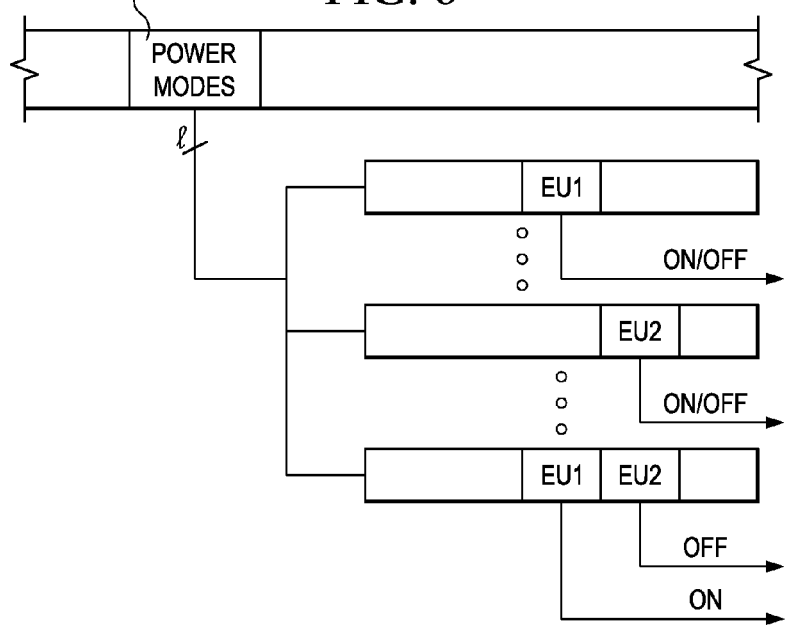
FIGS. 6 and 7 show distribution of power mode information to control power modes of processor resources in accordance with various embodiments.

The power modes field 504 may include information specifying current power mode of the execution unit, and/or power modes to be applied to one or more devices in the processor 100, such as execution units, peripherals, etc. The power modes field 504 may further specify power modes to be applied to processor resources with respect to specified processing chains. Each execution unit 102-108 can operate in a stand-alone mode allowing unneeded portions of the processor 100 to be turned off or placed in a low-power mode. Via the power mode information contained in the power modes field, an execution unit can control what portions of the processor 100 are active, and what portions of the processor 100 are in a reduced power state. FIG. 6 shows signals generated based on the power modes field 504 being applied to select control registers in the processor 100 that control power modes of execution units.

Figure 7:
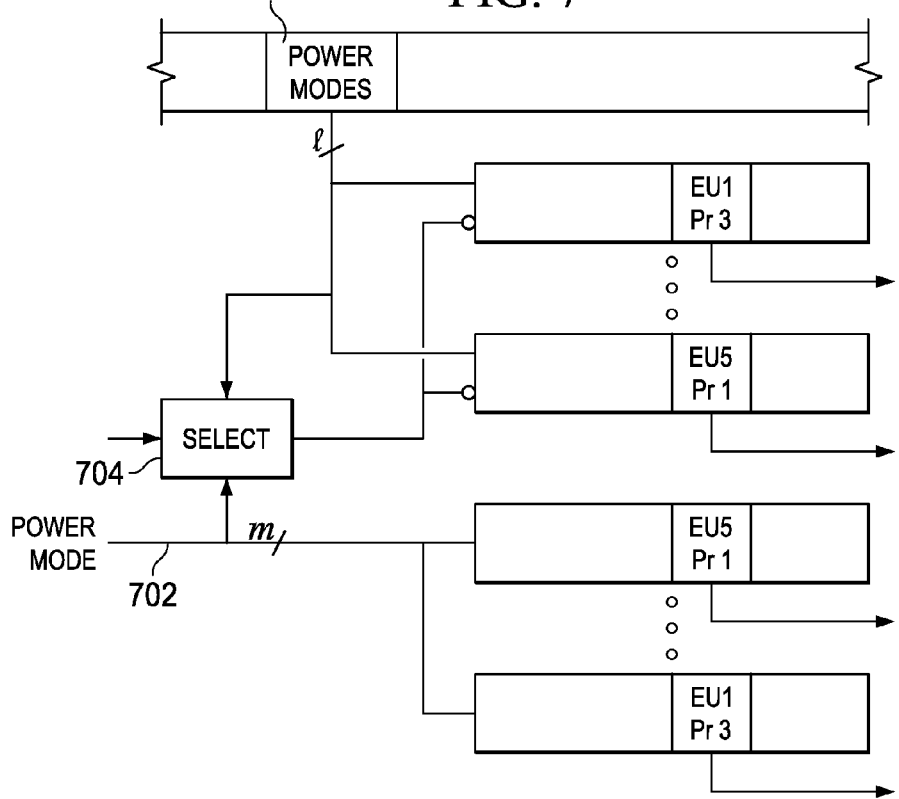

The processor 100 may also include selection/arbitration logic that manages power mode information provided from different sources in the processor 100, such as power mode information provided from power mode field 504 of different execution units or other sources in the processor 100. FIG. 7 shows selection of power mode information provided from different sources to control the power modes of the processor 100 in accordance with various embodiments. In FIG. 7, power mode information from a power mode field 504 of an execution unit is combined with power mode information 702 provided from another source (e.g., another power mode field 504 of a different execution unit) in the processor 100 to determine the power states applied in various execution units and execution processes. The select logic 704 may select any number of power mode signals from each source and/or combine power mode signals in accordance with rules and/or priorities provided in the select logic 704.

Figure 8:
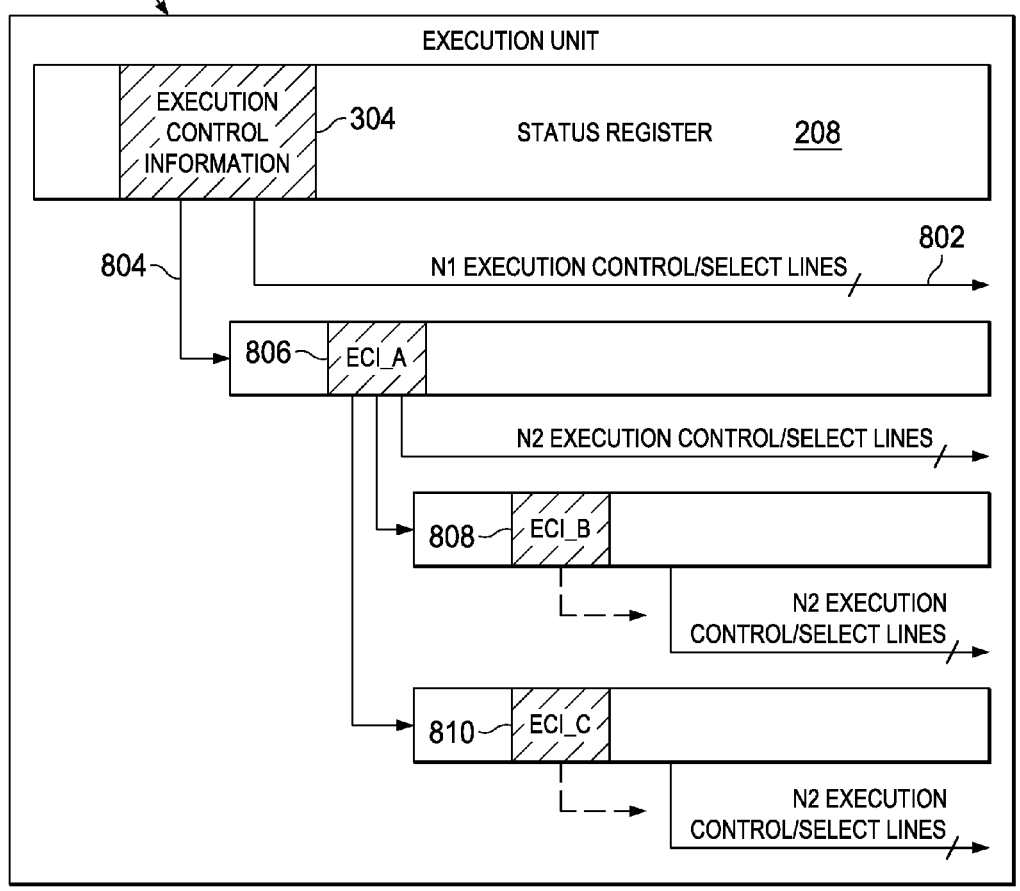
FIGS. 8 and 9 show distribution of execution control information to control resources of a processor and individual processing chains in accordance with various embodiments.

FIG. 8 shows distribution of execution control information to control resources of the processor 100 in accordance with various embodiments. In FIG. 8, a portion 802 of the execution control information provided by the ECI field 304 is applied to directly control resources of the processor 100. Another portion 804 of the execution control information is applied to select a second set 806 of stored execution control information. A first portion of the second set 806 of execution control information is applied to directly control resources of the processor 100, and a second and third portions of the second set 606 of execution control information are applied to select a third set 808 and a fourth set 610 of execution control information for application in the processor 100. The execution control information 806-810 may be stored in memory or registers. Such multi-level indirect execution control lists allows the execution unit 108 to provide an extensive array of control options.

Figure 9:
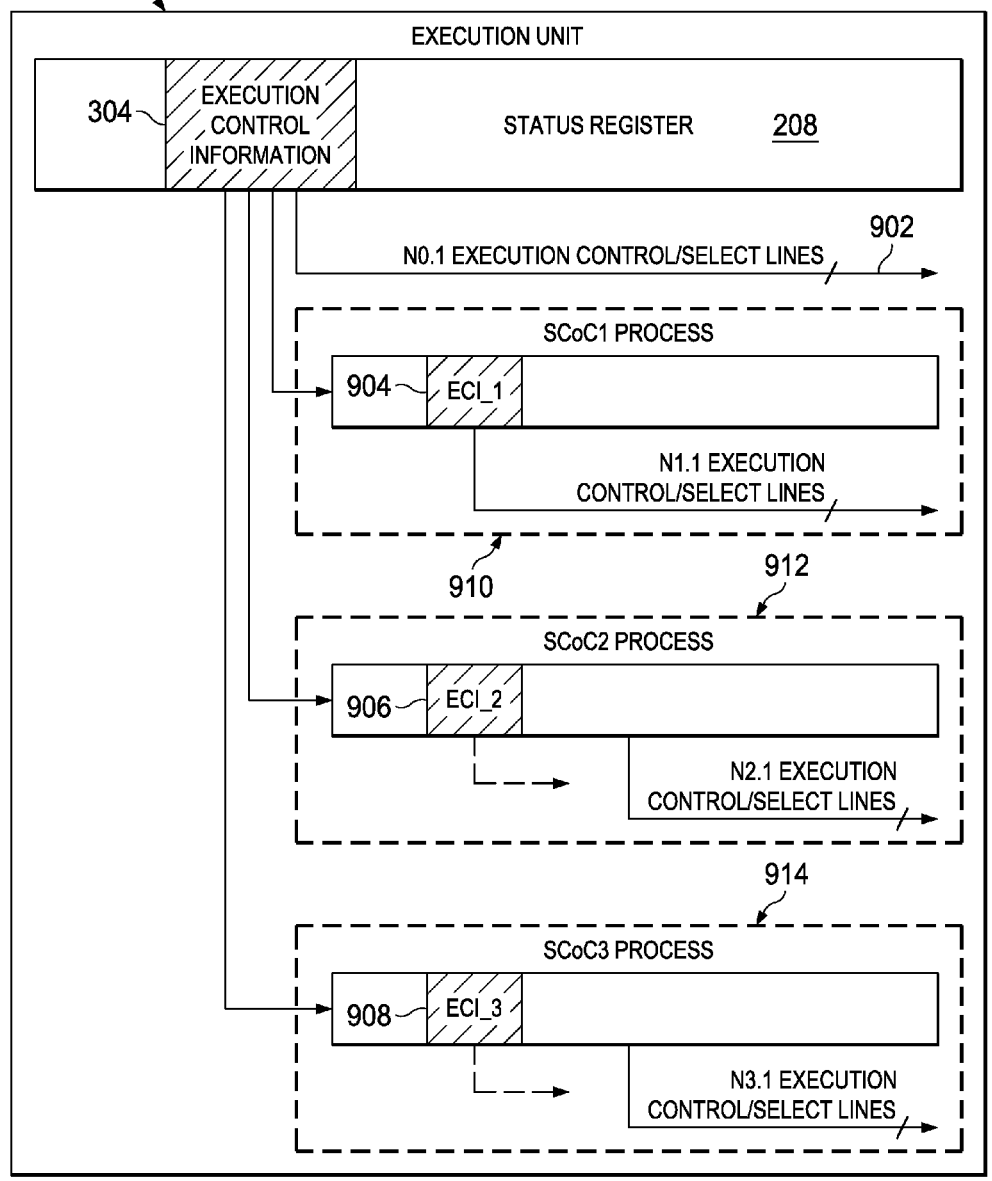

FIG. 9 shows a plurality of processing chains individually controlled via execution control information in accordance with various embodiments. Different processing chains may require application of different execution control information. As shown in FIG. 4, a single execution unit can simultaneously implement multiple processing chains. In FIG. 9, three different processing chains 910, 912, and 914 are being implemented in a single execution unit 108. A portion 902 of the execution control information provided by the ECI field 304 is applied to directly control resources of the processor 100. Other portions of the execution control information provided by the ECI field 304 are applied to select execution control information sets 904, 906, and 908 for application to processing chains 910, 912, and 914 respectively.

The above discussion is meant to be illustrative of the principles and various embodiments of the present invention. Numerous variations and modifications will become apparent to those skilled in the art once the above disclosure is fully appreciated. For example, while various operations and functions of the processor 100 have been described with reference to particular execution units, it is to be understood that the described operations and functions are not limited to any particular execution units. It is intended that the following claims be interpreted to embrace all such variations and modifications.

What is claimed is:

1. A processor, comprising:
   a processor core, comprising:
   a first execution unit; and
   a second execution unit coupled to the first execution unit; and
   a peripheral device coupled to the second execution unit;
   wherein the second execution unit is configured to execute a complex instruction, and comprises:
   a status register comprising an execution control information field configured to store execution control information, wherein the execution control information specifies operational parameters of the peripheral device; and
   execution control logic configured to apply the execution control information to generate one or more execution control signals, and to control operation of the peripheral device via the execution control signals.

2. The processor of claim 1, wherein the second execution unit is configured to:
   apply a first value of the execution control information to control the peripheral prior to execution of an interrupt service;
   apply a second value of the execution control information to control the peripheral during execution of the interrupt service; and restore the first value of the execution control information to control the peripheral at completion of the interrupt service.

3. The processor of claim 1, wherein the execution control information specifies at least one of:
   identification of the peripheral;
   power state of the peripheral;
   timing of operation of the peripheral;
   a state of instruction execution during which the execution control signals are to be generated; and
   conditions under which the control information is effective.

4. The processor of claim 1, wherein the execution control information is stored in the second execution unit prior to execution of an instruction during which the execution control signals are generated.

5. The processor of claim 1, wherein the execution control information stored in the status register comprises values for controlling a plurality of processes concurrently being executed by the second execution unit.

6. The processor of claim 1, wherein the second execution unit is configured to, on interruption of process execution:
   trigger execution in the first execution unit;
   identify a point of execution at which interaction with the peripheral can be resumed without error, and delay service of the interruption until the identified point of execution;
   initiate processing of the interruption at a point of execution of a current process at which interaction with the peripheral cannot be resumed at completion of the interrupt service, and resume execution of the current process, at completion of the interruption service, at a predetermined point other than the point of execution at which the interrupt was received, wherein the predetermined point is point at which the current process can be resumed without error; or
   initiate processing of the interruption at a point of execution of a current process at which interaction with the peripheral cannot be resumed at completion of the interrupt service, and resume execution, at completion of the interruption service, in a predetermined process other than the current process, wherein the predetermined process can be resumed without error; or
   suspend execution of the process until receipt of a resumption signal causes the second execution unit to continue process execution.

7. The processor claim 1, wherein the second execution unit is configured to enter a no operation state responsive to:
   receipt of a signal requesting entry of the no operation state;
   receipt of a signal indicating insufficiency of a resource needed to continue processing;
   receipt of a signal indicating lack of clock signals;
   receipt of a signal indicating low quality of data provided to the execution unit; or
   the peripheral being unable to respond to a request issued by the second execution unit.

8. The processor of claim 7, wherein the second execution unit is configured to issue a handshake signal to a device asserting a no operation request to the second execution unit; wherein the handshake signal indicates:
   entry into a requested no operation state is pending;
   time or operational state at which the requested no operation state will be entered;
   the requested no operation state has been entered; or
   conditions required by the second execution unit for entry into the no operation state.

9. The processor of claim 1, wherein the execution control information further comprises: information generated by the second execution unit describing a current activity state and status of the second execution unit; and information generated by the second execution unit describing a current inactivity state and status of the second execution unit.

10. The processor of claim 1, wherein the execution control information stored in the status register comprises information that specifies to the second execution unit:
    a source of a no operation request to which the second execution will respond;
    conditions under which the second execution unit will respond to the no operation request;
    a manner in which a process that is in a no operation state or of no operation status is to be started or restarted responsive to the removal of no operation request; and
    manner in which a currently executing process is to be stopped and restarted responsive to the no operation request.

11. The processor of claim 1, further comprising an instruction buffer configured to:
    provide instructions to the second execution unit;
    wherein the second execution unit is configured to:
      inhibit fetching of instructions into the instruction buffer based on a fullness level of the instruction buffer; and
      set the fullness level at which the fetching is inhibited.

12. The processor of claim 11, wherein the execution control information comprises information that directs the second execution unit, for each process being executed:
    as to what instruction in the instruction buffer the process: starts, ends, includes in a repeating instruction sequence, enters a suspension mode, was suspended, and is to be resumed;
    as to what information in the instruction buffer controls the process start, end, suspension, resumption, and application to a repeating instruction sequence;
    as to what events trigger the process to start, suspend, and resume execution.

13. The processor of claim 12, wherein the execution control information comprises privilege information that specifies a privilege level at which the second execution unit will start, end, is assigned to enter suspend mode, suspend, or resume a process.

14. The processor of claim 1, wherein the execution control information stored in the status register comprises power control information; wherein the second execution unit asserts power control signals in accordance with the power control information to set a power state of a device in the processor.

15. The processor of claim 14, wherein the power control information sets a different power state for each of a plurality of processes executed by the second execution unit.

16. The processor claim 14, wherein the processor comprises power control circuitry coupled to each execution unit, the power control circuitry configured to combine the power control signals asserted by each execution unit to set the power state of the device in the processor.

17. The processor of claim 14, wherein the second execution unit is configured to report power observation information comprising a power state for each of a plurality of processes executed by the second execution unit to a system manager of the processor.

18. A processor, comprising:
    a processor core, comprising:
      a first execution unit; and a second execution unit coupled to the first execution unit, wherein the second execution unit is configured to:
execute a complex instruction;
provide a plurality of processing chains, each of the processing chains comprising execution of an instruction sequence comprising a complex instruction; and
suspend execution of each of the processing chains while executing the instruction sequence comprising the complex instruction prior to completion of execution of the complex instruction;
resume execution of each of the processing chains based on detection of a trigger signal or trigger event that indicates execution of the processing chain is to continue.

19. The processor of claim 18, wherein the second execution unit is configured to:
trigger execution of instructions by the first execution unit responsive to suspension of execution of the complex instruction; or
resume execution at a predetermined non-sequential program location responsive to suspension of execution of the complex instruction.

20. The processor of claim 18, wherein the suspension of execution is triggered by:
a state of execution of the complex instruction;
a signal generated by the first execution unit; or
a signal generated by a peripheral device of the processor
an event generated by the first execution unit; or
an event generated by a peripheral device of the processor.

21. The processor of claim 18, wherein the second execution unit is configured to provide a handshake signal to a source of a trigger signal requesting suspension of execution; wherein the handshake signal specifies whether or when execution will be suspended responsive to the trigger signal.

22. The processor of claim 18, wherein the second execution unit comprises a status register, the status register comprising an execution control field configured to store information specifying at least one of:
execution unit activity state;
execution unit inactivity state;
cause of suspension of execution;
power mode information controlling a power mode of at least one of the first execution unit, the second execution unit, and a peripheral device of the processor.

23. The processor of claim 22, further comprising an instruction buffer coupled to the second execution unit, wherein the execution control field of the status register is configured to store information specifying, for each of the processing chains:
a starting instruction in the instruction buffer;
an ending instruction in the instruction buffer;
an instruction at which execution was suspended in the instruction buffer; and
an instruction at which execution is to be resumed in the instruction buffer.

24. A processor, comprising:
a processor core, comprising:
a first execution unit; and
a second execution unit coupled to the first execution unit;
an instruction buffer coupled to the second execution unit; and
a peripheral device coupled to the second execution unit;
wherein the second execution unit is configured to provide a processing chain comprising execution a complex instruction, and the second execution unit comprises:
a status register; and
execution control logic;
wherein the status register comprises an execution control information field configured to store execution control information, and the execution control information specifies:
execution unit activity state;
execution unit inactivity state;
cause of suspension of execution;
power mode information controlling the power mode of at least one of the first execution unit, the second execution unit, and the peripheral device;
wherein the execution control information field comprises execution control flags that are manipulatable to control, for the processing chain:
starting of execution;
suspension of execution;
resumption of execution; and
ending of execution; and
wherein the execution control logic configured to apply the execution control information and the execution control flags to generate execution control signals, and to control operation of the peripheral and execution of the processing chain via the execution control signals.

25. The processor of claim 24, wherein the second execution unit is configured to
suspend execution of the processing chain while executing the complex instruction prior to completion of execution of the complex instruction;
resume execution the processing chain based on receipt of a trigger signal that indicates execution of the processing chain is to continue;
trigger execution of instructions by the first execution unit responsive to suspension of execution of the complex instruction; and
resume execution at a predetermined non-sequential program location responsive to suspension of execution of the complex instruction.

* * * * *